(12) United States Patent
Hopkins (10) Patent No.: US 6,435,569 B1
(45) Date of Patent: Aug. 20, 2002

(54) PIPE CONNECTION

(75) Inventor: Howard C. Hopkins, North Kansas City, MO (US)

(73) Assignee: Ex-L-Tube, Inc., North Kansas City, MO (US)

( * ) Notice: Subject to any disclaimer, the term of this patent is extended or adjusted under 35 U.S.C. 154(b) by 0 days.

(21) Appl. No.: 09/200,814

(22) Filed: Nov. 27, 1998

(51) Int. Cl.[7] ............................................... F16L 25/00
(52) U.S. Cl. ........................ 285/334; 285/355; 285/390
(58) Field of Search ................................ 285/334, 333, 285/355, 390

(56) References Cited

U.S. PATENT DOCUMENTS

| | | | |
|---|---|---|---|
| 2,532,635 A | * 12/1950 | MacArthur | ................. 285/334 |
| 3,247,736 A | 4/1966 | Roth | |
| 4,508,375 A | * 4/1985 | Patterson et al. | ............ 285/334 |
| 4,521,042 A | * 6/1985 | Blackburn et al. | .......... 285/334 |
| 5,064,224 A | * 11/1991 | Tai | ............... 285/334 |
| 5,505,502 A | * 4/1996 | Smith et al. | ................. 285/334 |
| 5,749,605 A | 5/1998 | Hampton, III et al. | |
| 5,788,401 A | * 8/1998 | Drenth | ........................ 285/334 |
| 5,908,212 A | * 6/1999 | Smith et al. | ................. 285/355 |

\* cited by examiner

*Primary Examiner*—Teri Pham Luu (57) ABSTRACT

A pipe connecting structure incorporated in the male and female ends of the pipes rigidly secures pipes in sealed end-to-end relation. Each end has axially spaced tapered cylindrical surfaces with a continuous thread extended between the surfaces. Each thread has an axially inward directed leading wall extended from an annular inner wall to an annular outer wall. A radial trailing wall at the rear of the outer wall extends inwardly to the inner wall. The grooves between the threads have the same profile as the threads.

24 Claims, 7 Drawing Sheets

PIPE CONNECTION

FIELD OF THE INVENTION

The invention is in the field of screw threads adapted to couple tubes, pipes and rods together. The screw threads are related to dry seal taper pipe threads for connecting adjacent ends of pipes together; without a threaded coupling.

BACKGROUND OF THE INVENTION

Figure 1:
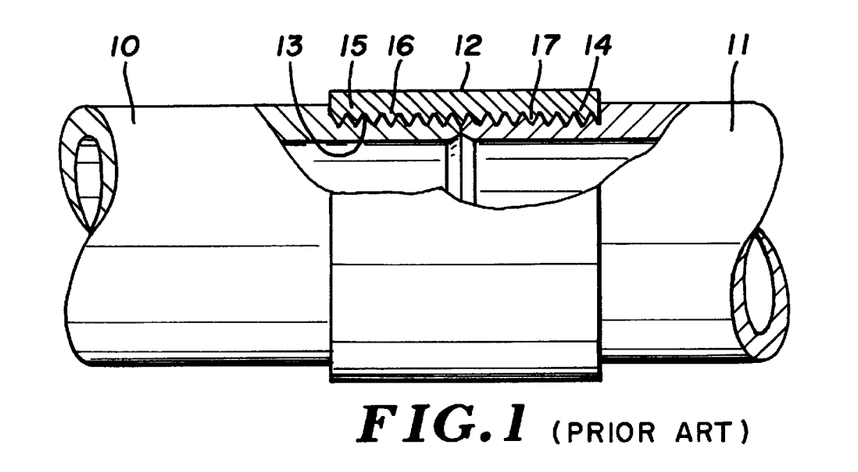
FIG. 1 is a side elevational view, partly sectioned, of a conventional prior art external pipe coupling connecting adjacent pipes.

A prior art pipe connection is illustrated in FIG. 1. Pipes 10 and 11 are standard metal or plastic tubular members having standard taper pipe threads 13 and 14. The standard pipe thread taper is 1 inch for every 16 inches in the length of the pipe. The number of threads per inch of pipe changes with the pitch diameter of the thread. The number of acme threads per inch is from 2 for large diameter pipes to 16 for small diameter pipes. The last thread 15 is a partial thread due to chamber on the die used to cut the thread. A tubular coupling 12 having internal threads 16 and 17 holds pipes 10 and 11 in end to end relationship. Threads 13, 16 and 14, 17 operatively engage each other to provide a structural connection between coupling 12 and pipes 10 and 11. The interengaging threads 13, 16 and 14, 17 also seal coupling 12 on pipes 10 and 11 to prevent fluids from entering the pipe passage and leakage of fluids from the pipes. The longitudinal axes of pipes 10 and 11 must be axially aligned with the longitudinal axis of coupling 12 to turn coupling 12 onto pipe 10 or turn the pipes into coupling 12. Pipe 11 must be axially aligned with coupling 12 and retained in axial alignment to prevent cross threading as pipe 11 is turned about it's longitudinal axis to thread pipe 11 into coupling 12. Axial alignment of large long pipes having standard pipe threads and turning of the pipes to prevent cross threading is a difficult procedure which requires considerable time and labor. The coupling 12 is a tubular sleeve that fits around the outside of adjacent ends of the pipe which prevents pipe connects with a coupling from being closely fitted into round and square passages of tubes and tubular beams.

SUMMARY OF THE INVENTION

The invention is a connecting structure for pipes, tubular members and cylindrical rods, such as metal and plastic pipes, and metal and plastic rods. The connecting structure is incorporated in female and male ends of pipes. Separate external or internal coupling or threaded sleeves are not used to join pipes in end-to-end relation. The sizes of the pipes passages are not altered so that the flow of fluid in the passages is not impeded. The exposed outside walls of the pipes have uniform dimensions and sizes which allow connected pipes to be placed with a close or contact fit inside tubes and box beams. The female end of a first pipe has a continuous internal thread. A continuous external thread is on the male end of a second pipe. The internal and external threads are complementary to each other so that when the threads are fully engaged the first and second pipes are rigidly connected in end-to-end relation. The threads have a novel profile and taper that allows for misaligned of the pipes during the pipe connecting process without cross threading of the threads. Each of the threads have an inwardly inclined leading wall extended between a generally flat outer wall and a generally flat inner wall. A radial trailing wall opposite the leading wall extends from the rear of the outer wall to the inner wall. The outer and inner walls of the threads taper axially inward relative to the longitudinal axes of the pipes. This allows the pipes to be turned relative to each other with a minimum of torque. When the pipes are in full or complete engagement, the threads lock up to rigidly connect the pipes together.

The preferred embodiment of the pipe connecting structure attaches generally aligned pipes together in a sealed relationship without external or internal couplings. The pipes have novel cooperating internal and external threads on female and male ends that allow for misaligned without cross threading of the threads. The female end of the first pipe has an annular flange provided with a tapered first internal annular surface. A tapered second internal annular surface is spaced axially inward from the first internal annular surface. An internal thread extends between the first and second internal surfaces. The male end of a second pipe is of a size that turns into the female end of the first to connect the pipes together. The male end has a annular sleeve having a first tapered outer annular surface with a size adopted to be located in tight surface engagement with the second internal surface. A tapered second external annular surface spaced axially inward from the first outer annular surface has a size to fit with tight surface engagement with the first internal surface. A continuous external thread extends between the first and second outer cylindrical surfaces. The external and internal threads are complementary to each other so that when the threads are fully engaged the threads lock up and the adjacent internal and external annular surfaces are in tight surface engagement with each other. Each of the threads have an inwardly inclined leading wall with an angle of about 45 degrees relative to the longitudinal axis of the pipe associated with the thread. The leading wall extends between a generally flat outer wall and a generally flat inner wall. A radial trailing wall opposite the leading wall extends radially from the rear of the rear wall to the inner wall. The outer and inner walls each have a length that is about twice the height of the trailing wall. The outer and inner walls have the same axially inward taper which is the same taper as the annular surfaces. The pitch diameters of the threads also have the same taper as the outer and inner walls of the threads. This taper is, for example, one degree relative to the longitudinal axes of the pipes.

DESCRIPTION OF THE PREFERRED EMBODIMENT

The pipe connecting structure of the invention, illustrated in the drawings, connects pipes 18 and 19 in sealed end to end relationship. Pipes 18 and 19 are long tubular members made of rigid materials, such as metal, ceramic, concrete, plastic, and fiber reinforced plastic. For example, pipes 18 and 19 can have a length of 6 meters and an outside diameter of 152 millimeters. The connecting structure is adaptable to all pipe lengths and pipe diameters and solid rods having male ends and recessed female ends.

Figure 2:
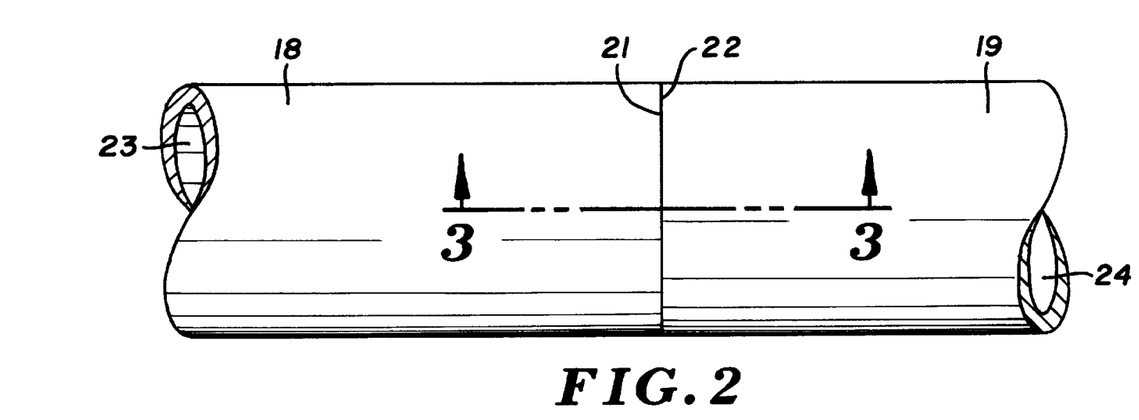
FIG. 2 is a side elevational view of first and second pipes secured together with the connecting structure of the invention.
Figure 3:
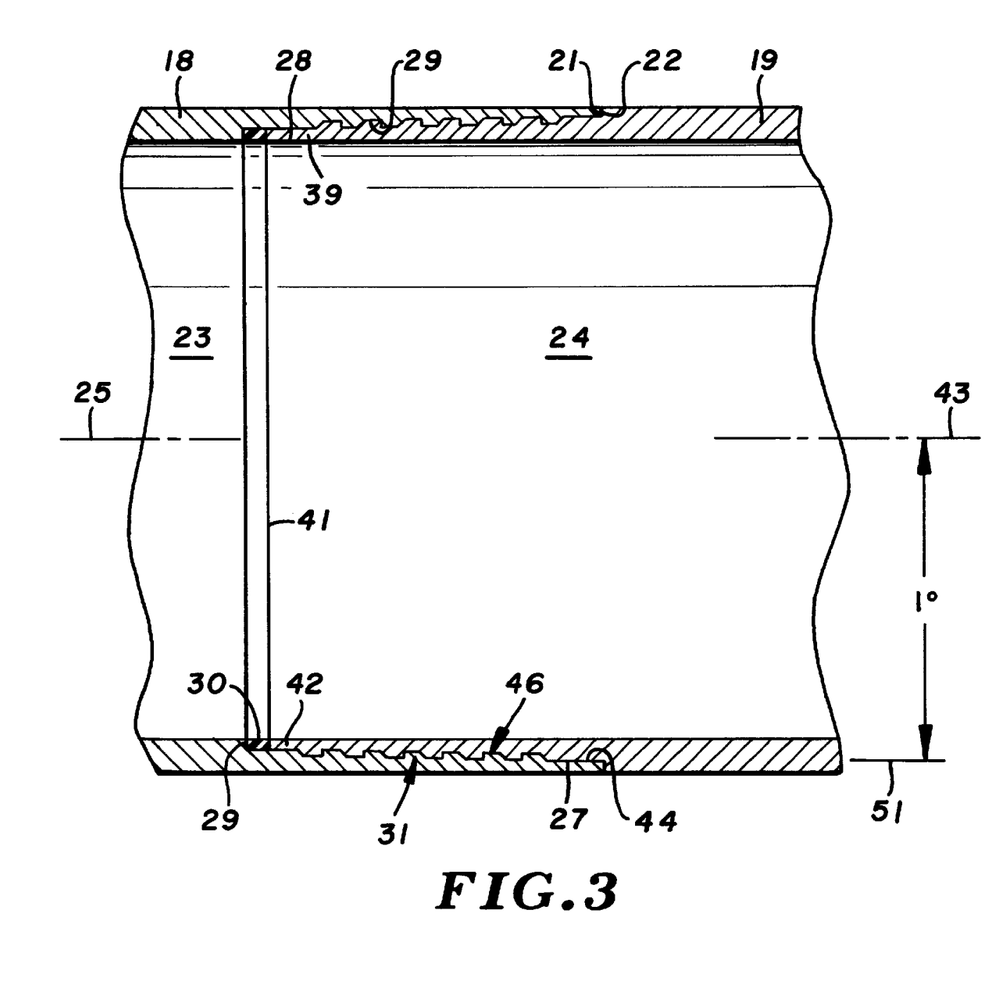
FIG. 3 is an enlarged sectional view taken along the line 3—3 of FIG. 2.
Figure 6:
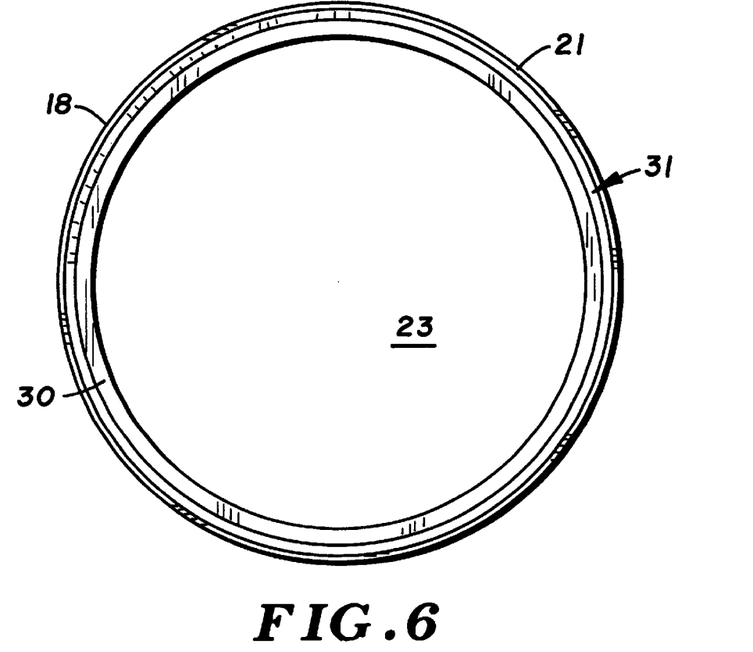
FIG. 6 is an end view of the female end of the first pipe.
Figure 7:
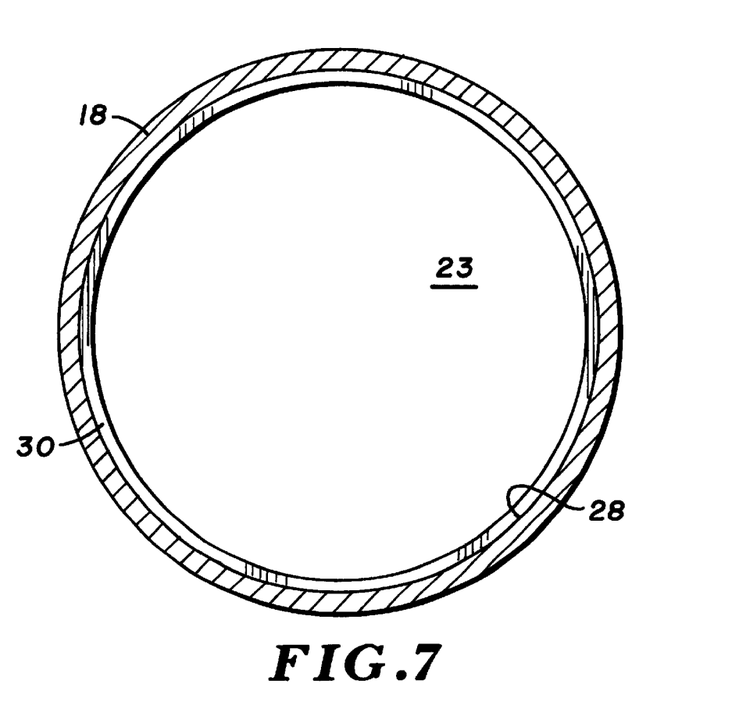
FIG. 7 is a sectional view taken along line 7—7 of FIG. 4.
Figure 8:
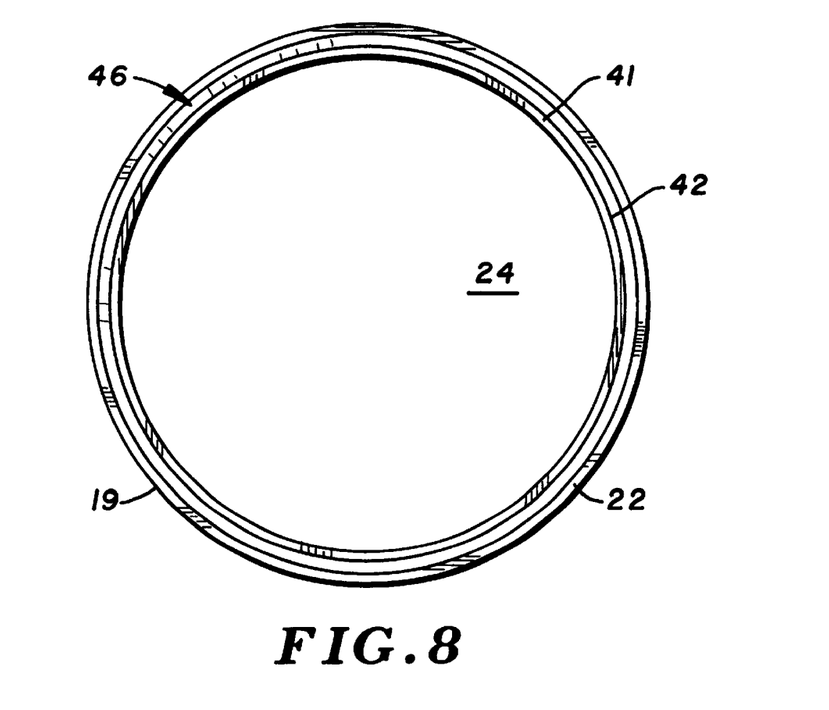
FIG. 8 is an end view of the male end of the second pipe.
Figure 9:
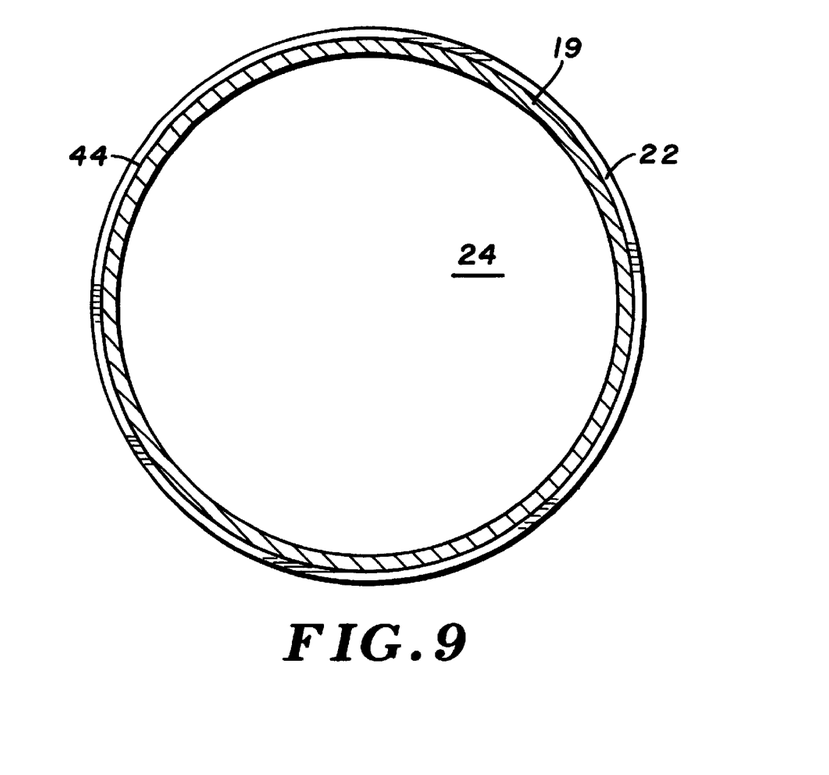
FIG. 9 is a sectional view taken along line 9—9 of FIG. 5.

As shown in FIGS. 2 and 3, when pipes 18 and 19 are connected in end to end relationship the circular, end 21 of pipe 18 is in tight surface engagement with an annular shoulder 22 of pipe 19. The annular surface of end 21, shown in FIG. 6, is continuous and has a radial dimension that is the same as the radial length of annular surface of shoulder 22, shown in FIG. 9. The outer cylindrical surfaces of pipes 18 and 19 are coextensive with each other. A separate sleeve or tubular coupling is not used to connect pipes 18 and 19. There is no increase in size or diameters of the connected pipes. This allows the connected pipes to be inserted into tubes and box beams with the outer walls of the pipes in engagement with the inside walls of the tubes or box beams.

Figure 10:
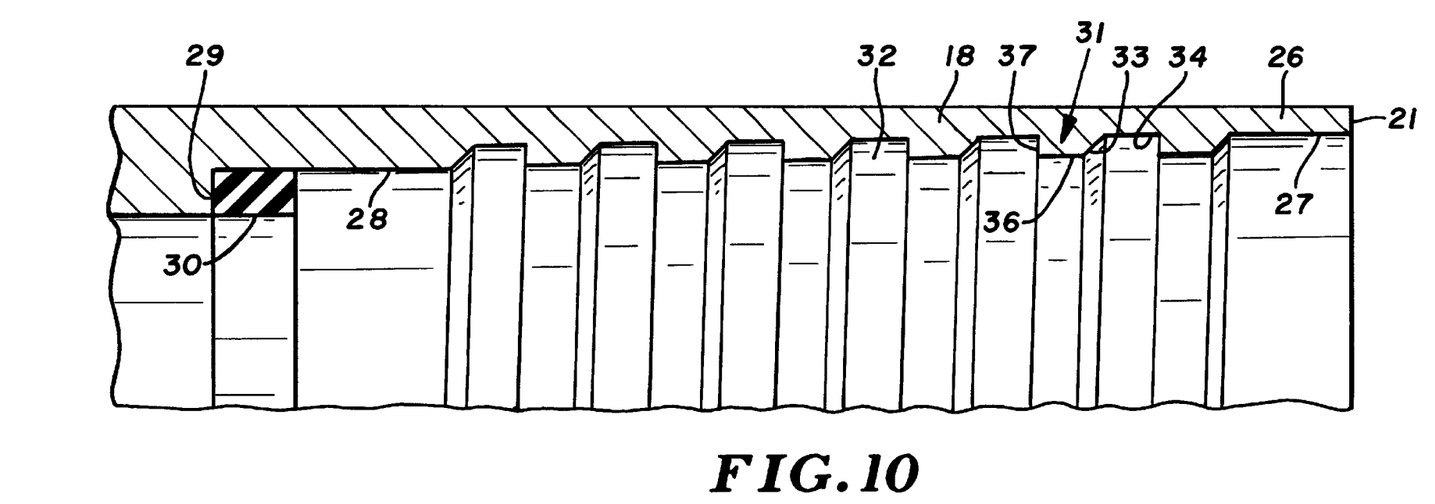
FIG. 10 is an enlarged sectional view of the internal threads in the female end of the first pipe.
Figure 11:
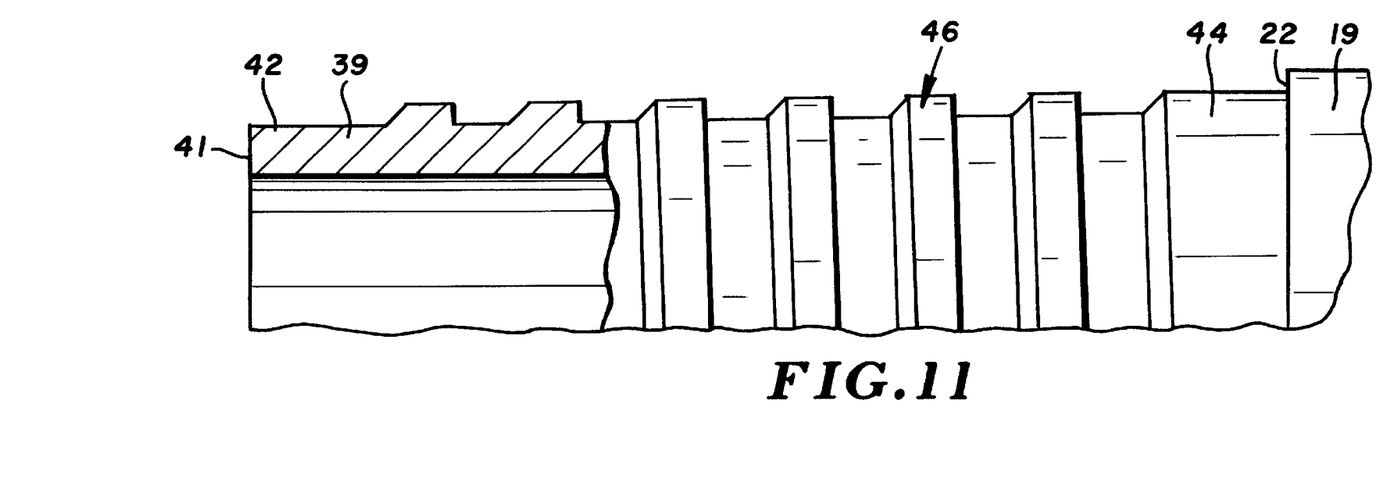
FIG. 11. is an enlarged sectional view, partly sectioned, of the external threads of the male end of the second pipe.
Figure 12:
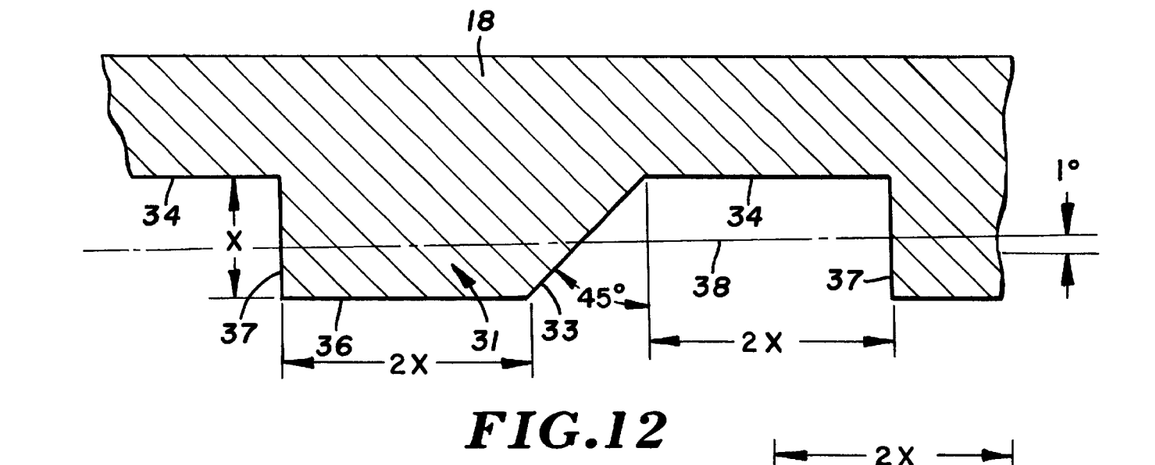
FIG. 12 is an enlarged profile view of the internal thread of the first pipe.

Pipe 18 has a female end terminating in an annular sleeve or flange 26 having a first inside annular surface 27. Surface 27 is continuous and tapers radially outwardly toward end 21. The end 21 of sleeve 26 is located in a transverse plane normal to the longitudinal axis 25 of pipe 18. The female end of pipe 18 has a continuous second inside annular surface 28 located inwardly from end 21 and an annular inwardly directed annular shoulder 29 projected generally normal to surface 28. Surface 28 tapers radially outwardly toward end 21 at a small angle relative to the axis 25 of pipe 18. Internal threads 31 are helically disposed between surfaces 27 and 28. Threads 31 are separated with a spiral groove 32. As shown in FIG. 10, each thread 31 has an inwardly inclined leading wall or face 33 extended from the root or minor diameter wall 34 to a major diameter curved wall 36. The trailing wall 37 of thread 31 extends radially inward from wall 36 to minor diameter wall 34. As shown in FIG. 12, thread 31 is a modified square thread having with the length 2X of wall 36 being twice the height X of trailing wall 37 of the thread. The radial length of back wall 37 is the height of thread 31. Walls 34 and 36 are parallel to each other and normal to trailing wall 37. Leading wall 33 slopes inwardly at an angle of 45 degrees relative to a transverse plane of pipe 18 and the longitudinal axis of the pipe 18. The pitch diameter of the thread 31 is the diameter to an imaginary line 38 drawn through the thread profile such that the widths of the thread and groove are equal. The line 38 has a small converging inwardly directed taper with respect to the longitudinal axis 25 of pipe 18. The taper is about 1 degree relative to the longitudinal axis 25 of pipe 18. Surface 27 has about the same diameter as minor diameter surface 34 and is parallel to line 38 which represents the pitch diameter of thread 31. Surface 28 has about the same diameter as major diameter wall 36 and is parallel to line 38 and concentric with cylindrical wall 27.

Figure 13:
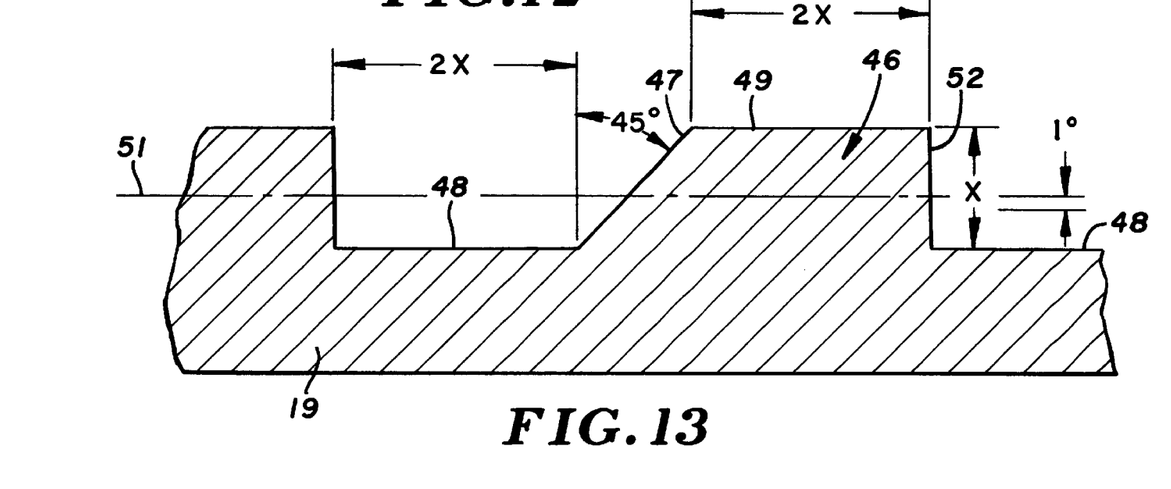
FIG. 13 is an enlarged profile view of the external thread of the second pipe.

Pipe 19 has a male end terminating in an annular sleeve or flange 39 having an end surface 41 and a first external annular surface 42. End surface 41 is in a transverse plane normal to the longitudinal axis 43 of pipe 19. A second cylindrical surface 44 located adjacent shoulder 22 separates shoulder 22 from external thread 46. Thread 46 is a continuous helical thread extended from sleeve 39 to second surface 44. Thread 46 has an inclined leading wall 47 extended from minor diameter wall 48 to a major diameter wall 49. Wall 47 is inclined forwardly and inwardly at an angle of about 45 degrees relative to the pitch diameter line 51, shown in FIG. 13. The pitch diameter of thread 46 is represented by line 51 which has a small outwardly converging taper with respect to the longitudinal axis 43 of pipe 19. The taper is about 1 degree relative to the longitudinal axis 43 of pipe 18. Annular surface 42 has about the same diameter as the minor diameter surface 48 and is parallel to line 51. Annular surface 44 has about the same diameter as the major diameter surface 49 of thread 46. As shown in FIG. 13, major diameter wall 49 has a axial length 2X that is twice as long as the height X of trailing wall 52 of thread 46. External thread 46 has the same profile as internal thread 31 so that the complementary thread surfaces engage each other when the threads 31 and 46 are fully engaged to rigidly connect the pipes together.

A threading machine is used to cut the threads 31, 46 on pipes 18, 19. Single point threading tools, threading chasers, taps and dies can be used to cut threads 31, 46. The pipe forming process cuts threads 31, 46 on ends of the pipes without reducing the strength of the joined or connected pipes. The pipes 18, 19 are low carbon steel in the range of ASTM-C1015 to C1022. The pipe has a minimum diameter 0.030 inches over the stated diameter. The weld flash on the inside of the pipe is controlled during the pipe making process to a maximum of 0.015 inches built up in addition to the wall thickness.

Figure 4:
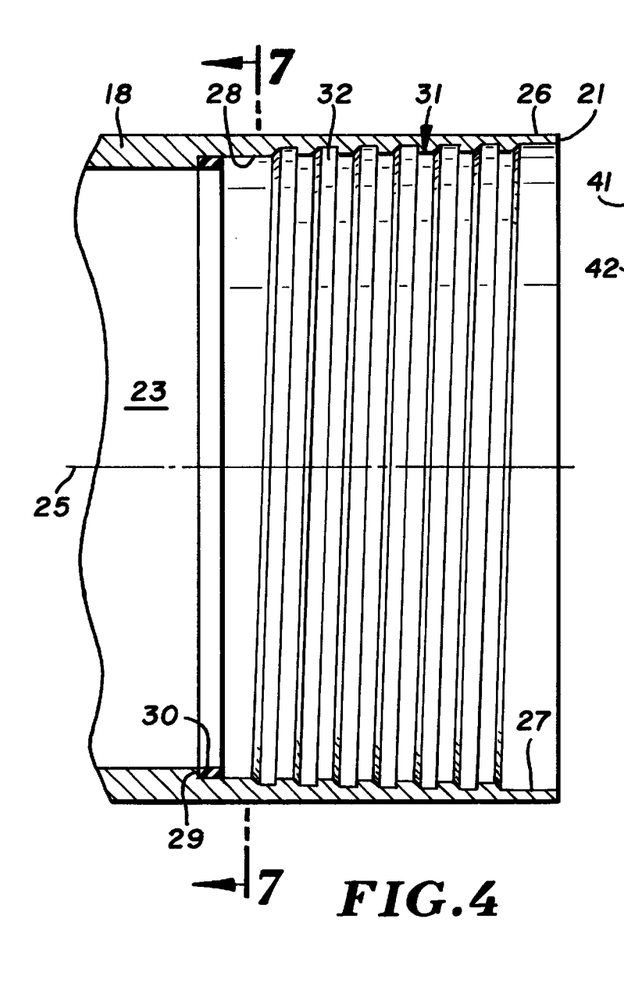
FIG. 4 is an enlarged sectional view of the female end of the first pipe of FIG. 2.
Figure 5:
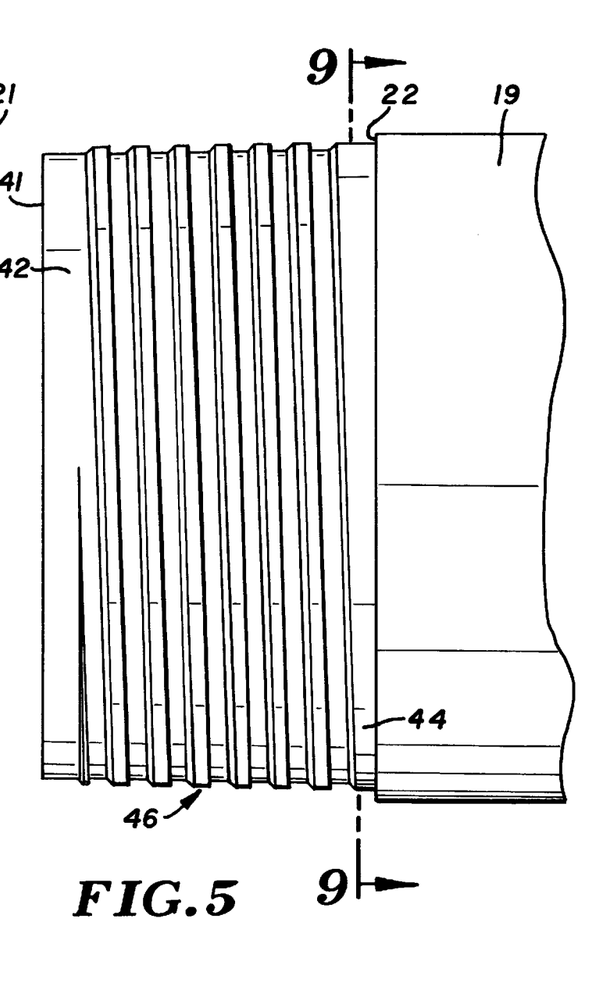
FIG. 5 is an enlarged side elevational view of the male end of the second pipe of FIG. 2.

In use, pipes 18 and 19 are placed in end-to-end position, as shown in FIGS. 4 and 5, with the longitudinal axes 25 and 43 of pipes 18 and 19 in general longitudinal alignment. Exact longitudinal alignment of axes 25 and 43 is not required to couple the pipes together. Long pipes located in trenches cannot be readily longitudinally aligned in end-to-end relationship. When conventional pipe threads and couplings are used to connect these pipes, precise longitudinal alignment of the pipes is required to prevent cross threading. Threads 31 and 46 on pipes 18 and 19 allow long pipes to be coupled together without precisely longitudinally aligning the pipes.

The male surface 42 has a diameter smaller than the internal diameter of female inside surface 27. This allows the end of pipe 19 to be positioned in the entrance of pipe 18 until threads 31 and 46 contact each other. Pipe 19 or pipe 18 is turned about it's longitudinal axis so that threads 31 and 46 inter-engaged with each other. Threads 31 and 46 have minimum contact with each other and minimum resistance to turning of the pipe since both threads 31 and 46 have the same taper relative to the longitudinal axes 25 and 43 of the pipes.

When pipes 18 and 19 are completely connected together, as shown in FIG. 3, end 21 of pipe 18 bears against shoulder 22 of pipe 19. As shown in FIGS. 3, 4 and 10, a circular seal 30 located on surface 28 engages shoulder 29. When pipes 18 and 19 are connected together end 41 of pipe 18 engages seal 30 and retains seal 30 in engagement with shoulder 29. The tapered surfaces 27, 44 and 28, 42 are in tight surface sealing engagement. The thread walls 34, 49 and back walls 37, 52 are also in tight surface sealing engagement. The thread connection of pipes 18 and 19 have strong longitudinal strength, completely seals the walls of the pipes, and does not weaken the walls of the pipes.

From the foregoing detailed description of the present invention is having been shown and described how the objects of the invention have been obtained in preferred manners. However, modifications and equivalents of the disclosed concepts, such as those which readily occur to those skilled in the art, are intended to be included within the scope of this invention. This invention is intended to be limited only by the scope of the claims which are, or which may hereafter be, appended hereto.

What is claimed is:

1. Pipe connecting structure comprising: a first pipe having a female end including an annular flange at the outer end thereof, a first internal inwardly tapered annular surface on said annular flange, a second internal inwardly tapered annular surface spaced axially inward from the first internal annular surface, a continuous internal thread extended between the first and second internal surfaces, a second pipe having a male end of a size to fit into the female end of the first pipe, said male end having a sleeve at the outer end thereof, said sleeve having a first external surface with a size and taper for surface engagement with the second internal surface, a second external surface spaced axially inward from the first external annular surface, said second external surface having a size and taper for surface engagement with the first internal surface, a continuous external thread extended between the first and second outer annular surfaces, said internal and external threads have the same taper as said annular surfaces, and said external thread being complementary to the internal thread whereby when the internal and external threads fully engage each other the adjacent internal and external tapered annular surfaces are in surface engagement with each other.

2. The pipe connecting structure of claim 1 wherein: the annular flange of the female end of the first pipe has an annular end, and the male end of the second pipe has an outwardly directed annular shoulder located axially inward from the end of the second pipe, said annular end of the flange being engageable with the annular shoulder when the internal and external threads are fully engaged.

3. The pipe connecting structure of claim 1 wherein: the first internal annular surface is larger than the second internal annular surface, and the first external annular surface is smaller than the second external annular surface.

4. The pipe connecting structure of claim 1 wherein: the first pipe has an inwardly directed annular shoulder adjacent the second internal inwardly tapered surface, an annular seal located on the second internal inwardly tapered surface and engageable with said shoulder, said second pipe having an end surface engageable with said seal when the internal and external threads are fully engaged.

5. The pipe connecting structure of claim 1 wherein: the taper of the threads is converging about 1 degree relative to the longitudinal axis of the first and second pipes.

6. The pipe connecting structure of claim 1 wherein: each of the internal and external threads having an inwardly inclined leading wall, an outer wall, and an inner wall, and a radial trailing wall.

7. The pipe connecting structure of claim 6 wherein: the leading wall is inclined about 45 degrees relative to the aligned longitudinal axes of the first and second pipes.

8. The pipe connecting structure of claim 6 wherein: the outer wall and inner wall each having an axial length that is about two times the height of the radial trailing wall.

9. The pipe connecting structures of claim 8 wherein: the outer and inner walls have the same tapers as the annular surfaces.

10. The pipe connecting structure of claim 1 wherein: each of the internal and external threads have an inwardly and rearwardly inclined leading wall, an outer wall, an inner wall, and a radial trailing wall.

11. The pipe connecting structure of claim 10 wherein: the leading wall is inclined about 45 degrees relative to the aligned longitudinal axes of the first and second pipes.

12. The pipe connecting structure of claim 10 wherein: the outer wall and inner wall each having an axial length that is about two times the height of the radial trailing wall.

13. The pipe connecting structure of claim 10 wherein: the outer and inner walls taper inwardly relative to the longitudinal axes of the first and second pipes.

14. The pipe connecting structure of claim 13 wherein: the taper of the outer and inner walls is converging about 1 degree relative to the aligned longitudinal axes of the first and second pipes.

15. Pipe connecting structure comprising: a first pipe having a female end including an annular flange at the outer end thereof, a first internal inwardly tapered annular surface on said annular flange, a second internal inwardly tapered annular surface spaced axially inward from the first internal annular surface, a continuous internal thread extended between the first and second internal surfaces, said internal thread having an inwardly and rearwardly inclined leading wall, an outer wall, an inner wall, and a radial wall, a second pipe having a male end of a size to fit into the female end of the first pipe, said male end having a sleeve at the outer end thereof, said sleeve having a first external annular surface with a size and taper for surface engagement with the second internal surface, a second external annular surface spaced axially inward from the first external annular surface, said second external surface having a size and taper for surface engagement with the first internal surface, a continuous external thread extended between the first and second outer annular surfaces, said external thread having an inwardly and forwardly inclined leading wall, an outer wall, an inner wall, and a radial trailing wall, said internal and external threads have the same incline as said annular surfaces, and said external thread being complementary to the internal thread whereby when the internal and external threads fully engage each other the adjacent internal and external tapered annular surfaces are in surface engagement with each other.

16. The pipe connecting structure of claim 15 wherein: the first internal annular surface is larger than the second internal annular surface, and the first external annular surface is larger than the second internal annular surface, and the first external annular surface is smaller than the second external annular surface.

17. The pipe connecting structure of claim 15 wherein: the leading wall of the internal thread is inclined about 45 degrees relative to the longitudinal axis of the first pipe.

18. The pipe connecting structure of claim 15 wherein: the outer and inner walls of the internal thread taper axially inward relative to the longitudinal axis of the first pipe.

19. The pipe connecting structure of claim 15 wherein: the outer and inner walls of the internal thread each have an axial length that is about two times the height of the radial trailing wall of the internal thread.

20. The pipe connecting structure of claim 15 wherein: the leading wall of the external thread is inclined about 45 degrees relative to the longitudinal axis of the second pipe.

21. The pipe connecting structure of claim 15 wherein: the outer wall and inner wall of the external thread each have an axial length that is about two times the height of the radial trailing wall of the external thread.

22. The pipe connecting structure of claim 15 wherein: the outer and inner walls of the external threads taper forwardly and axially inward relative to the longitudinal axis of the second pipe.

23. The pipe connecting structure of claim 15 wherein: the incline of the internal and external threads is converging about 1 degree relative to the longitudinal axes of the first and second pipes.

24. The pipe connecting structure of claim 15 wherein: the first pipe has an inwardly directed annular shoulder adjacent the second internal inwardly tapered surface, an annular seal located on the second internal inwardly tapered surface and engageable with said shoulder, said second pipe having an end surface engageable with said seal when the internal and external threads are fully engaged.

* * * * *